US012801791B2

(12) United States Patent
Ogasawara

(10) Patent No.: US 12,801,791 B2
(45) Date of Patent: Nov. 17, 2026

(54) SETTING METHOD OF ROOT FILE SYSTEM OF COMPUTER AND COMPUTER PROGRAM

(71) Applicant: SEIKO EPSON CORPORATION, Tokyo (JP)

(72) Inventor: Naoki Ogasawara, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 37 days.

(21) Appl. No.: 18/991,963

(22) Filed: Dec. 23, 2024

(65) Prior Publication Data

US 2025/0209214 A1 Jun. 26, 2025

(30) Foreign Application Priority Data

Dec. 26, 2023 (JP) ................................ 2023-218788

(51) Int. Cl.
*G06F 21/64* (2013.01)

(52) U.S. Cl.
CPC .................................... *G06F 21/64* (2013.01)

(58) Field of Classification Search
CPC ........ G06F 21/64; G06F 21/575; G06F 3/062; G06F 3/0643; G06F 3/0644; G06F 16/1744
See application file for complete search history.

(56) References Cited

U.S. PATENT DOCUMENTS

2021/0350027 A1* 11/2021 Sakurada ................ G06F 21/74

FOREIGN PATENT DOCUMENTS

| | | | | | |
|---|---|---|---|---|---|
| CN | 115629820 A | * | 1/2023 | ......... | G06F 9/44505 |
| CN | 110874467 B | * | 5/2023 | ............. | G06F 21/64 |
| JP | 2019003275 A | * | 1/2019 | | |
| JP | 2021-177593 A | | 11/2021 | | |

* cited by examiner

*Primary Examiner* — Han Yang

(74) *Attorney, Agent, or Firm* — Harness, Dickey & Pierce, P.L.C.

(57) ABSTRACT

The disclosed method includes (a) a step of reading a compressed file obtained by compressing the entire partition of the root file system and an electronic signature of the compressed file from an external storage device and loading the compressed file and the electronic signature into a work area of a RAM of the computer, (b) a step of executing verification of the electronic signature for the compressed file loaded in the work area, and (c) a step of, when the verification is successful, setting the root file system by expanding the compressed file in the external storage device.

2 Claims, 10 Drawing Sheets

SETTING METHOD OF ROOT FILE SYSTEM OF COMPUTER AND COMPUTER PROGRAM

The present application is based on, and claims priority from JP Application Serial Number 2023-218788, filed Dec. 26, 2023, the disclosure of which is hereby incorporated by reference herein in its entirety.

BACKGROUND

1. Technical Field

The present disclosure relates to a setting method of a root file system of a computer and a computer program.

2. Related Art

The root file system is the file system that stores the root directory and is the file system at the top of all other file systems that are mounted when the system boots. The root file system contains a number of startup files that are used when the computer starts up. Although the root file system is written in the ROM of the computer, there is a case where it is desired to update the root file system to a new root file system by using an external storage device such as an SD card in order to upgrade a part of the root file system.

In recent years, in order to improve security, it has been required to verify that firmware has not been tampered with. In order to secure boot a computer, it is necessary to verify the authenticity of the files contained in the root file system, but since the root file system on the SD card contains a large number of files, it takes time to verify the signature of files one by one.

JP-A-2021-177593 discloses a method for verifying the authenticity of a plurality of files. In this method, the system startup storage in the information processing device is divided into a partition 1 for storing files to be verified and a partition 2 for storing files not to be verified. Then, a plurality of files are compressed to create a compressed file, authentication data thereof is generated, and both are stored in the partition 1. When the compressed file is used, the signature of the compressed data is verified by using the authentication data, and when the authentication is successful, the plurality of files are expanded in the partition 2.

However, in JP-A-2021-177593, there is a problem that the authenticity of the entire root file system cannot be guaranteed because the system startup file in the root file system has already been started before the signature verification of the compressed file. Therefore, a technique that can guarantee the authenticity of the entire root file system is desired.

SUMMARY

According to a first aspect of this disclosure, a setting method of a root file system of a computer, includes (a) a step of reading a compressed file obtained by compressing the entire partition of the root file system and an electronic signature of the compressed file from an external storage device and loading the compressed file and the electronic signature into a work area of a RAM of the computer, (b) a step of executing verification of the electronic signature for the compressed file loaded in the work area, and (c) a step of, when the verification is successful, setting the root file system by expanding the compressed file in the external storage device.

According to a second aspect of this disclosure, A non-transitory computer-readable storage medium storing a computer program for executing a process of setting up a root file system of a computer, the computer program causing the computer to execute: (a) a process of reading a compressed file obtained by compressing the entire partition of the root file system and an electronic signature of the compressed file from an external storage device and loading the compressed file and the electronic signature into a work area of a RAM of the computer, (b) a process of executing verification of the electronic signature for the compressed file loaded in the work area, and (c) a process of, when the verification is successful, setting the root file system by expanding the compressed file in the external storage device.

DESCRIPTION OF EMBODIMENTS

A. First Embodiment

Figure 1:
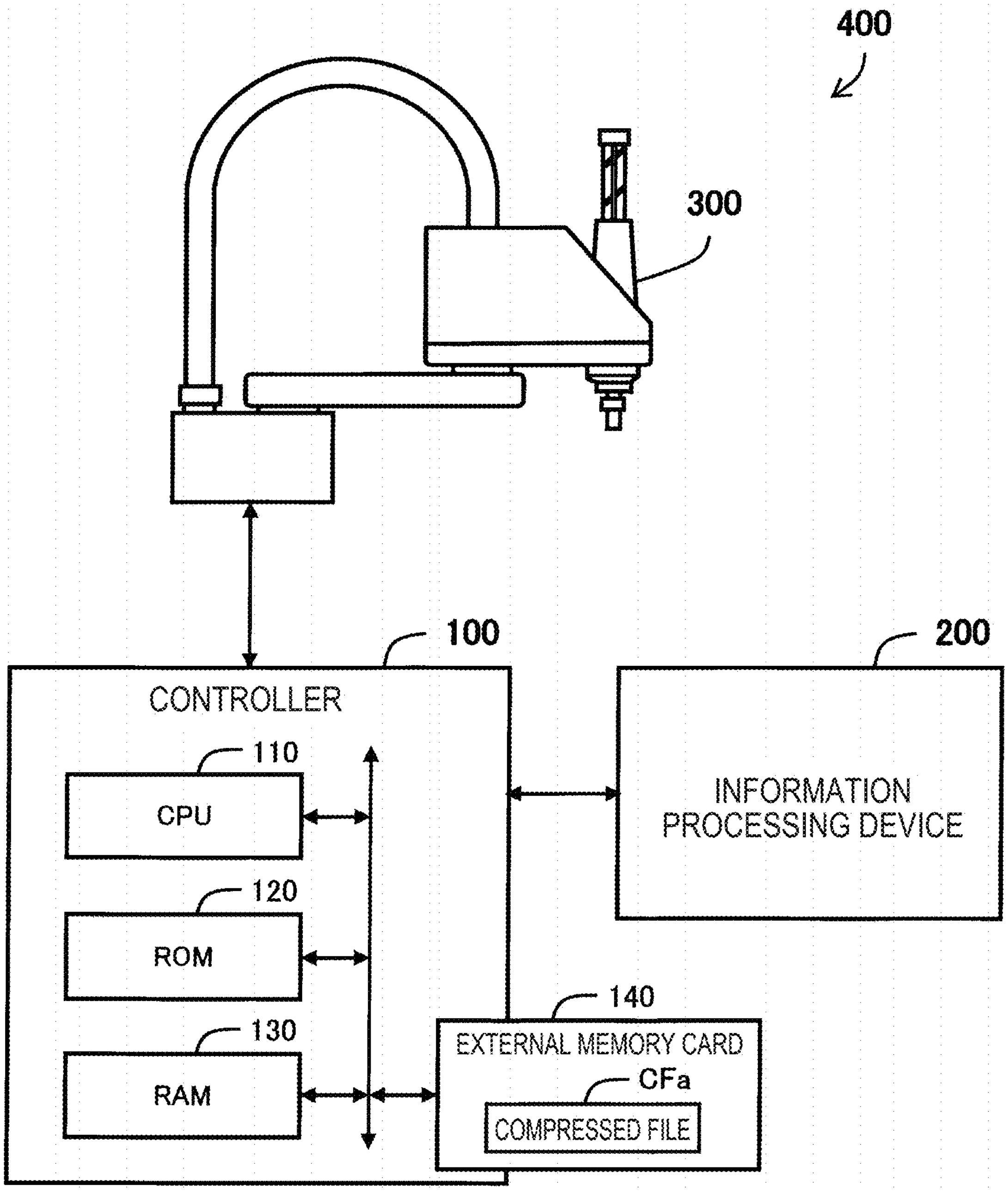
FIG. 1 is a block diagram of a robot system according to the embodiment.

FIG. 1 is a block diagram illustrating the configuration of robot system 400 in one embodiment. The robot system 400 includes a controller 100, an information processing device 200, and a robot body 300. The controller 100 is a computer called a "robot controller". The controller 100 and the information processing device 200 function as a control system for controlling the robot body 300. For example, the controller 100 functions as a lower control device, and the information processing device 200 functions as an upper control device. Alternatively, the information processing device 200 may be omitted, and the robot body 300 may be controlled only by the controller 100. As the information processing device 200, for example, a personal computer can be used.

The controller 100 has a CPU 110 as a processor, a RAM 130, a ROM 120, and an external memory card 140. The ROM 120 is formed of, for example, a flash ROM. The external memory card 140 is, for example, an SD card, and is inserted into a memory card slot of the controller 100. The memory card slot may be connected to the controller 100 via a USB interface. The external memory card 140 stores a compressed file CFa including the entire root file system.

The present disclosure is applicable not only to the controller 100 for a robot, but also to other types of computers. In addition, as the external storage device for storing the compressed file CFa, other types of external storage devices other than SD cards can be used.

Figure 2:
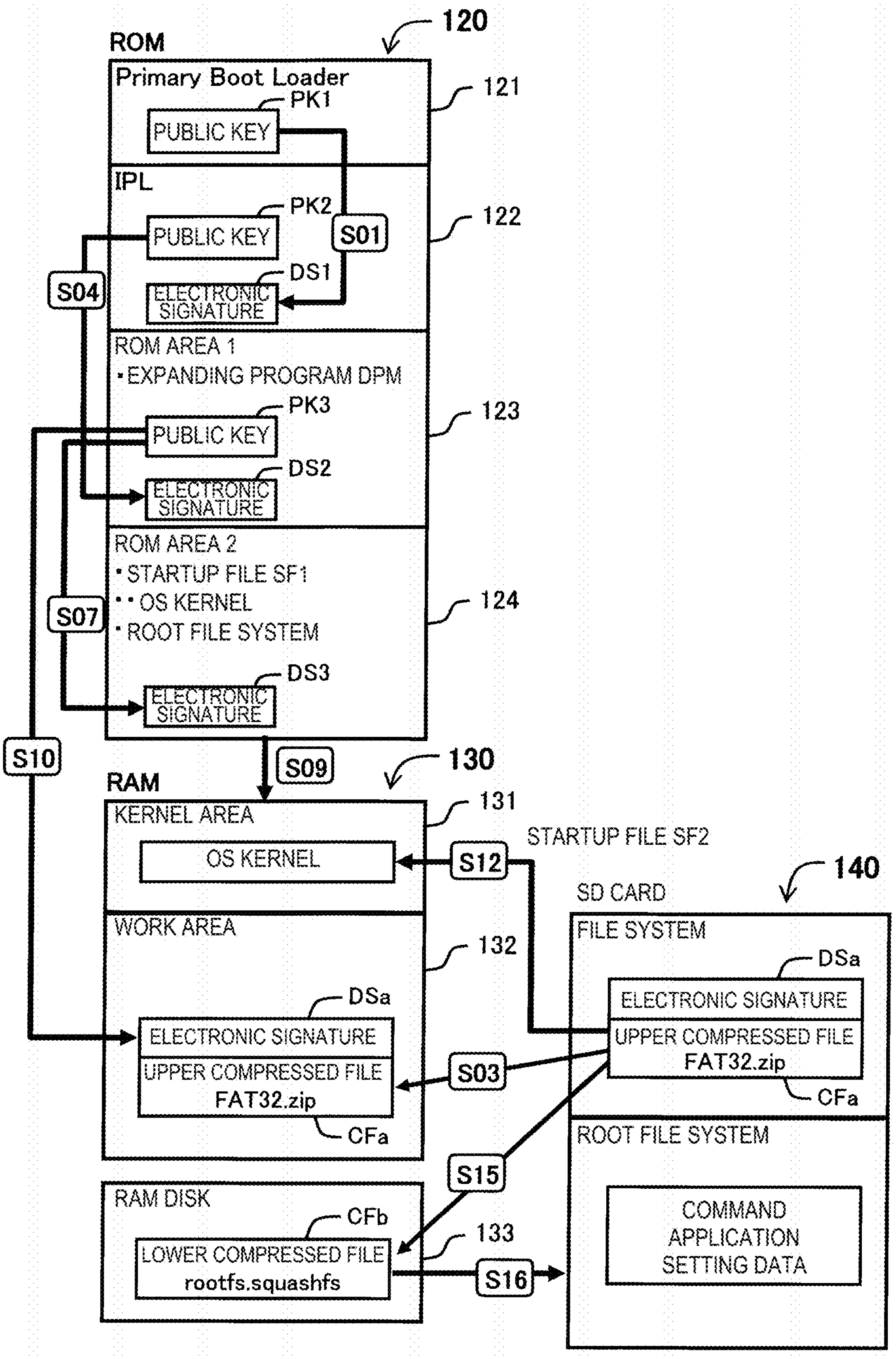
FIG. 2 is an explanatory diagram of a startup process of the controller according to the first embodiment.
Figure 3:
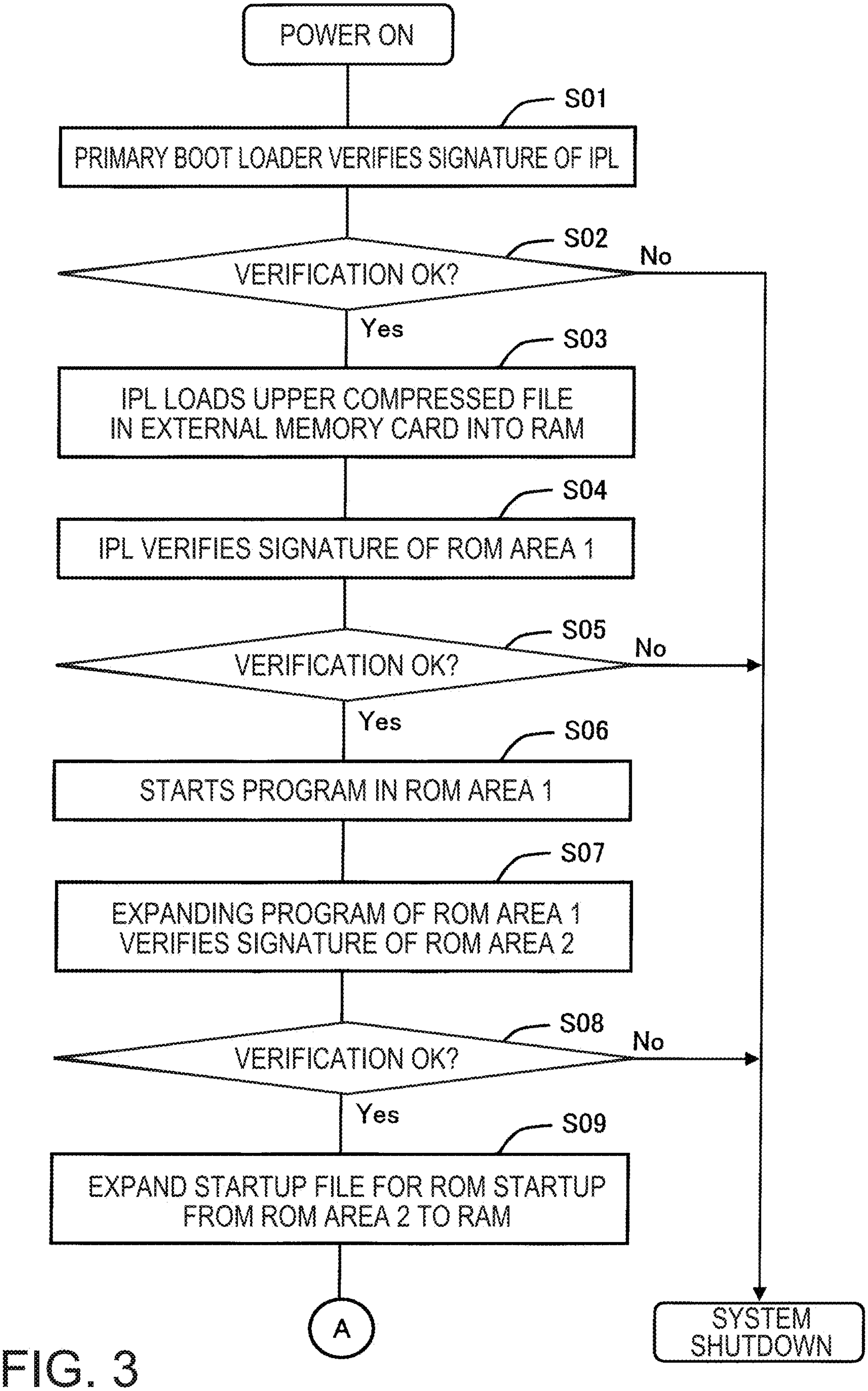
FIG. 3 is a flowchart showing a procedure of a startup process of the controller according to the first embodiment.
Figure 4:
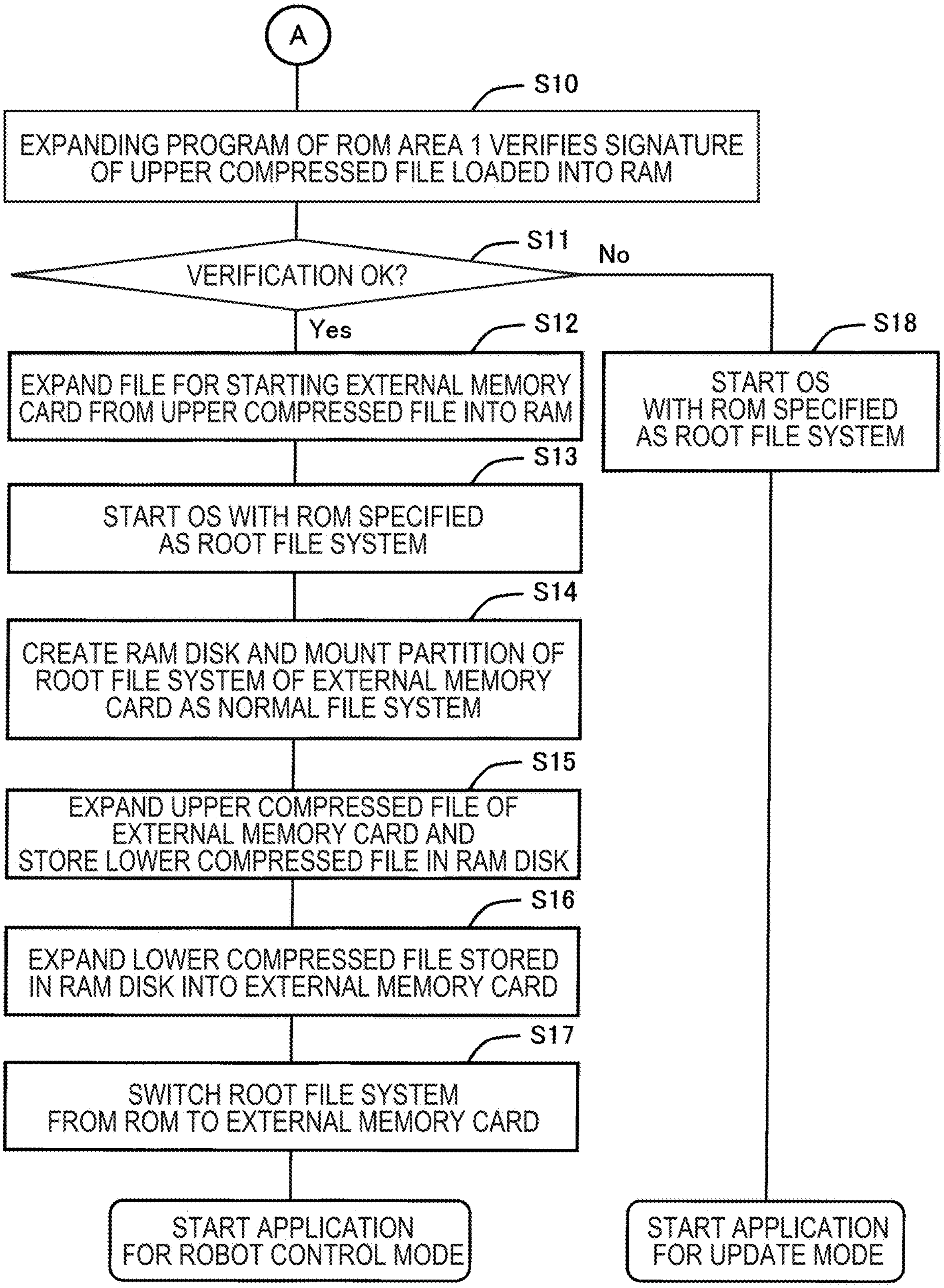
FIG. 4 is a flowchart showing a procedure of a startup process of the controller according to the first embodiment.

FIG. 2 is an explanatory diagram of the startup process of the controller 100 according to the first embodiment. FIGS. 3 and 4 are flowcharts showing the procedure of the startup process. In FIG. 2, some of the step numbers of FIGS. 3 and 4 are added. Hereinafter, processes related to the setting of the root file system will be described with reference to FIGS. 2 to 4, and description of other processes such as initialization of hardware will be omitted.

The ROM 120 includes a first boot loader area 121, a second boot loader area 122, a first ROM area 123, and a second ROM area 124. In the first boot loader area 121 stores a primary boot loader. In the second boot loader area 122 stores an initial program loader (IPL) as a secondary boot loader. As the IPL, for example, U-boot is used. The first ROM area 123 stores a plurality of programs including an expanding program DPM for expanding a file and authenticating an electronic signature. In the second ROM area 124 stores a startup file SF1 used when starting the controller 100 and a root file system. The startup file SF1 includes an OS kernel.

In the following description, the first ROM area 123 is referred to as a "ROM area 1" and the second ROM area 124 is referred to as a "ROM area 2". In this embodiment, Linux® is used as an operating system (OS). However, the contents of the present disclosure can be applied to other operating systems other than Linux®.

The RAM 130 includes a kernel area 131 and a work area 132. In the first embodiment, a part of the RAM 130 is used as the RAM disk 133.

The external memory card 140 stores a compressed file CFa including the entire root file system. This compressed file CFa is stored in a normal file system that is not the root file system. This normal file system is, for example, FAT32. In the present embodiment, since the compressed file CFa is compressed in the zip format, a name "FAT32.zip" is given in FIG. 2. The electronic signature DSa is attached to the compressed file CFa. The compressed file CFa includes a compressed file CFb obtained by compressing the entire partition of the root file system and a startup file SF2 for starting up the system using the external memory card 140 as the root file system.

The compressed file Cobb obtained by compressing the entire partition of the root file system is a file in a squashfs format, which is a compressed file format for Linux®, and is named rootfs.squashfs in FIG. 2. The entire partition of the root file system is configured in accordance with EXT 4, a file system commonly used in Linux®.

The compressed file Cafe is created by further compressing the compressed file CFb obtained by compressing the entire partition of the root file system in another compressed file format. In the following description, the compressed file CFa is also referred to as an "upper compressed file CFa", and the compressed file CFb is also referred to as a "lower compressed file CFb". The reason why two stage compression is performed is that, in addition to the lower compressed file CFb, the startup file SF2 for starting the system with the external memory card 140 as the root file system and other data are compressed to create the upper compressed file CFa, and an electronic signature is attached to the upper compressed file CFa, so that these files can be collectively verified as a whole. However, the startup process of the present disclosure may be executed by using a compressed file obtained by compressing the entire partition of the root file system by one stage compression without performing such two stage compression.

When signature verification of the upper compressed file CFa is successful in a procedure to be described later, a root directory is set in the external memory card 140, and a root file system is expanded from the lower compressed file CFb. The root file system includes, for example, the following various programs and data.

(1) Command (2) Application program (3) Setting data

These programs and data are stored in respective directories provided under the root directory. The lower compressed file CFb is created by compressing an image file of the root file system expanded into a format that can be written to the external memory card 140. An "image file" is data in which data recorded in a storage device is saved while maintaining a file or folder structure.

The process of FIG. 3 is started in response to the power-on of the controller 100. In step S01, the primary boot loader verifies the electronic signature DS1 of the IPL. For this verification, the public key PK1 stored in advance in the first boot loader area 121 is used.

In step S02, the primary boot loader determines whether the IPL verification was successful. In the case where the verification of the IPL fails, the system is stopped and the processes of FIG. 3 are terminated. On the other hand, in the case where the verification of the IPL is successful, the process proceeds to step S03, where the IPL loads the upper compressed file CFa in the external memory card 140 into the work area 132 of the RAM 130.

In step S04, the IPL verifies the electronic signature DS2 in area 1. This verification is preferably the verification of the entire ROM area 1, but may also be the verification of the expanding program DPM stored in the ROM area 1. For this verification, the public key PK2 stored in advance in the second boot loader area 122 is used.

In step S05, the IPL determines whether or not the verification of the ROM area 1 is successful. In the case where the verification of the ROM area 1 fails, the system is stopped and the processes of FIG. 3 are terminated. On the other hand, in the case where the verification of the ROM area 1 is successful, the process proceeds to step S06, and the IPL starts the program in the ROM area 1. The program to be started includes at least the expanding program DPM.

In step S07, the expanding program DPM of the ROM area 1 verifies the electronic signature DS3 of the ROM area 2. This verification is preferably verification of the entire ROM area 2, but may be verification of the startup file SF1 and the root file system stored in the ROM area 2. For this verification, the public key PK3 previously stored in the ROM area 1 is used.

In step S08, the expanding program DPM determines whether or not the verification of the ROM area 2 is successful. In the case where the verification of the ROM area 2 fails, the system is stopped and the processes of FIG. 3 are terminated. On the other hand, in the case where the verification of the ROM area 2 is successful, the process proceeds to step S09, and the expanding program DPM expands the startup file SF1 for starting the ROM from the ROM area 2 to RAM 130. The startup file SF1 includes an OS kernel. The OS kernel is expanded into the kernel area 131 of the RAM 130. This startup file SF1 is referred to as a "first startup file SF1". If the first startup file SF1 is expanded at this point, the OS kernel can be started using the authentic first startup file SF1 stored in the ROM 130 in advance in the case where the verification of the upper compressed file CFa fails in the procedure to be described later.

In step S10 of FIG. 4, the expanding program DPM of the ROM area 1 verifies the electronic signature DSa of the upper compressed file CFa that was loaded into the work area 132 of the RAM 130 in step S03. For this verification, the public key PK3 stored in the ROM area 1 is used. In the example of FIG. 2, the public key PK3 is the same as that used for verification of the ROM area 2, but both may be different public keys. In the case where the verification of step S10 is successful, the authenticity of the lower compressed file CFb included in the upper compressed file CFa, that is, the compressed file CFb obtained by compressing the partitions of the entire root file system, is guaranteed.

In step S11, the expanding program DPM determines whether or not the verification of the upper compressed file CFa has succeeded. In the case where the verification of the upper compressed file CFa failed, the process proceeds to step S18, where ROM 120 is specified as the root file system, and the OS kernel expanded in the kernel area 131 is started up in step S09. After the OS kernel is started, the application program for the update mode contained in the root file system is started. The "update mode" is a process mode in which the upper compressed file CFa stored in the external memory card 140 is overwritten with another upper compressed file that is considered to be authentic. Another upper compressed file with an electronic signature is transferred from an external device such as the information processing device 200. After step S18, it is preferable to rewrite the upper compressed file CFa stored in the external memory card 140 in the update mode.

In the case where the verification of the upper compressed file CFa is successful, the process proceeds to step S12, where the expanding program DPM reads the upper compressed file CFa from the external memory card 140 and expands the startup file SF2 included in the upper compressed file CFa into RAM 130. The startup file SF2 is a file for starting the system using the external memory card 140 as a root file system. This startup file SF2 is referred to as a "second startup file SF2." The second startup file SF2 includes an OS kernel, and is overwritten with the first startup file SF1 expanded in the RAM 130 in the above-described step S09. If the second startup file SF2 is overwritten in the first startup file SF1, the OS kernel can be started using the authentic second startup file SF2 that was included in the upper compressed file CFa in which the verification of the electronic signature was successful.

The first startup file SF1 and the second startup file SF2 may have different functions. For example, the first startup file SF1 may have the function of the update mode and may not have the function as the controller of the robot. On the other hand, it is preferable that the second startup file SF2 has a function as a robot controller. The first startup file SF1 is preferably smaller in data amount than the second startup file SF2.

In step S13, the expanding program DPM starts the OS kernel with ROM 120 specified as the root file system. At this time, it is preferable to set a device-tree for ROM startup using the init=/root command. At this point, since the root file system is specified in the ROM 120, the external memory card 140 is not used as the root file system.

In step S14, the OS kernel creates the RAM disk 133 and mounts the partition of the root file system of the external memory card 140 as a normal file system. The reason why the partition of the root file system is mounted as a normal file system is that the ROM 120 is specified as the root file system in the above-described step S13.

In step S15, the OS kernel expands the upper compressed file CFa of the external memory card 140 and stores the lower compressed file CFb in the RAM disk 133. In step S16, the OS kernel expands the lower compressed file CFb stored in the RAM disk 133 into the external memory card 140. As a result, as shown in FIG. 2, the root file system is set in the external memory card 140. In step S17, the OS kernel switches the root file system from the ROM 120 to the external memory card 140. More specifically, the root file system is switched using the pivot_root command.

When the root file system is set in step S17, the application program for the robot control mode is started. "Robot control mode" means a mode in which the controller 100 functions as a robot controller. The description of subsequent processes are omitted.

As described above, in the first embodiment, in the case where the verification of the electronic signature is successful for the compressed file CFa loaded in the work area 132 of the RAM 130, the root file system is set by expanding the compressed file CFa in the external memory card 140, so that the authenticity of the entire root file system can be guaranteed. Further, in the first embodiment, unlike the prior art for verifying individual files, since the compressed file CFa including the root file system is collectively verified, as compared with the prior art, it is possible to shorten the time required for verification. Furthermore, in the first embodiment, in the case where the verification of the compressed file CFa is unsuccessful, ROM 120 is set as the root file system, so that when the verification of the compressed file CFa is unsuccessful, the controller can be started using the authentic root file system stored in ROM 120.

B. Second Embodiment

Figure 5:
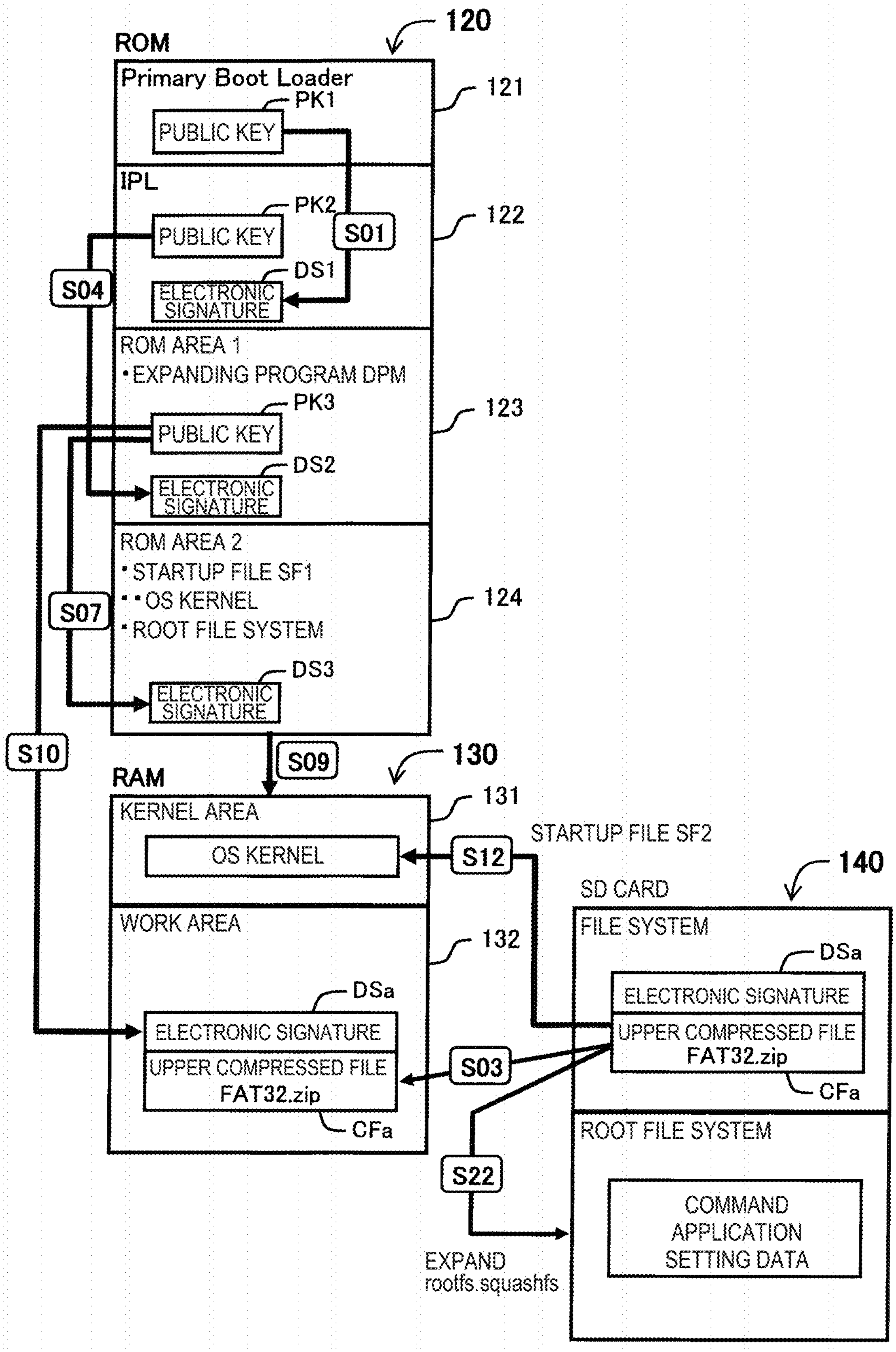
FIG. 5 is an explanatory diagram of a startup process of the controller according to the second embodiment.
Figure 6:
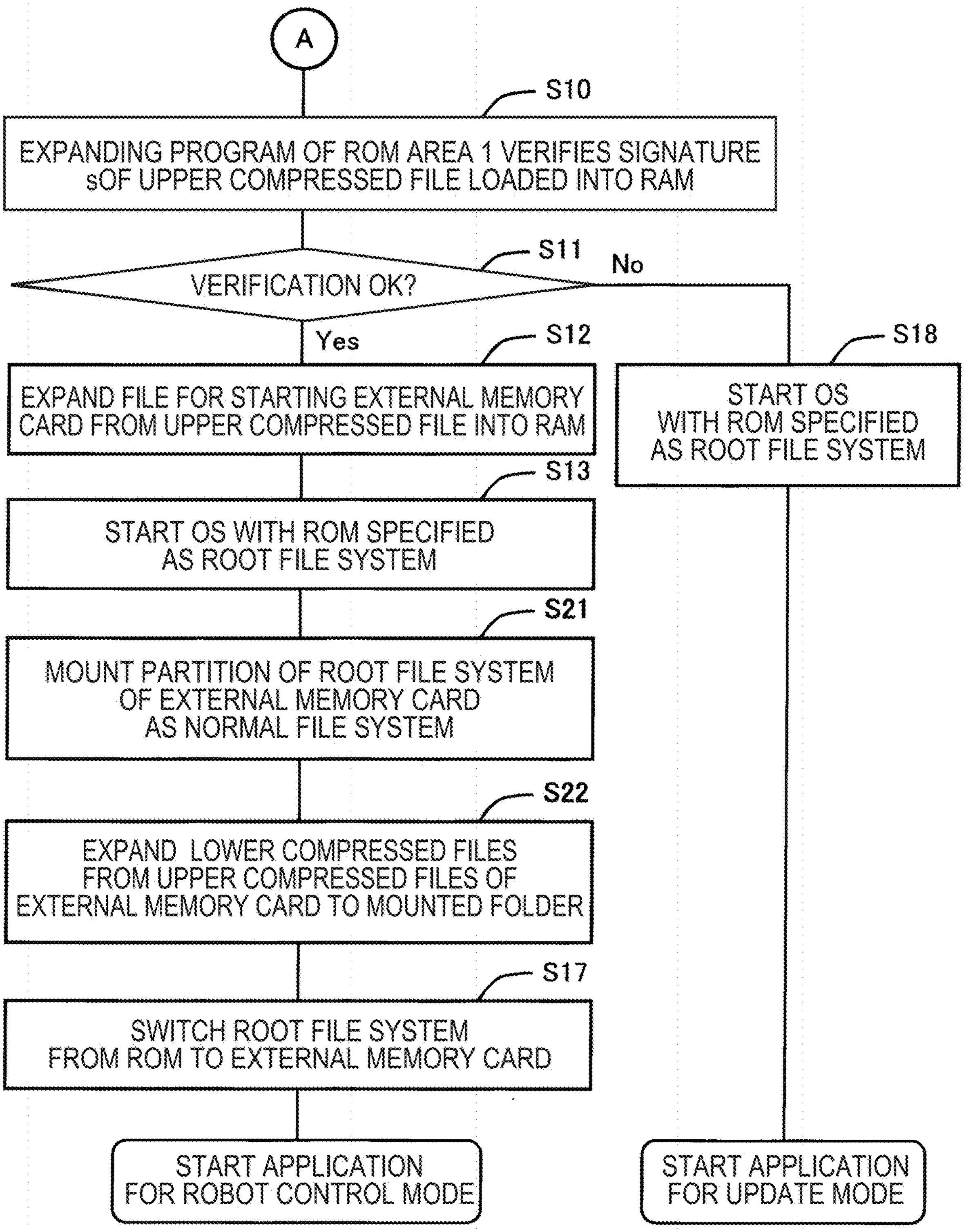
FIG. 6 is a flowchart showing a procedure of a startup process of the controller according to the second embodiment.

FIG. 5 is an explanatory diagram of the startup process of the controller 100 in the second embodiment, FIG. 6 is a flowchart showing the procedure of the startup process. FIG. 5 is obtained by changing a part of FIG. 2 of the first embodiment, FIG. 6 is obtained by changing a part of FIG. 4 of the first embodiment. Since the processes of FIG. 3 are the same as those of the first embodiment, the description thereof will be omitted.

The second embodiment differs from the first embodiment in the following two points, and is substantially the same as the first embodiment except for these points.

(1) The RAM disk 133 is not used.

(2) Steps S14 to S16 in FIG. 4 are replaced with steps S21 to S22 in FIG. 6.

In step S21 of FIG. 6, the OS kernel mounts the partition of the root file system of the external memory card 140 as a normal file system. In step S22, the OS kernel expands the rootfs.squashfs, which is the lower compressed file CFb, from the upper compressed file CFa of the external memory card 140 to the folder mounted in step S21. As a result, as shown in FIG. 5, the root file system is set in the external memory card 140. The description of other processes is omitted.

The second embodiment also has substantially the same effect as the first embodiment. Further, since the RAM disk 133 is not used in the second embodiment, there is an advantage that memory resources can be saved.

C. Third Embodiment

Figure 7:
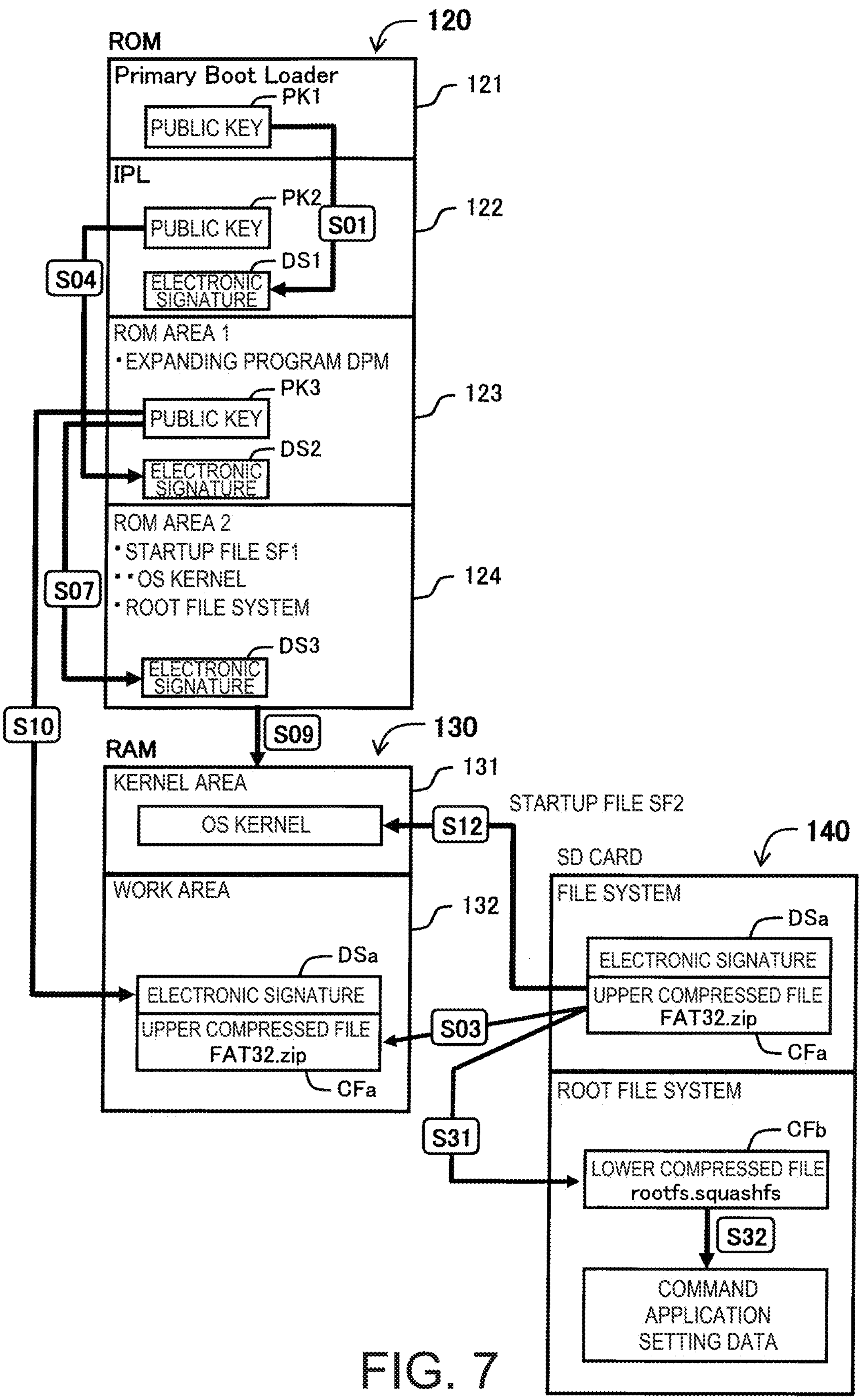
FIG. 7 is an explanatory view of a startup process of the controller according to the third embodiment.
Figure 8:
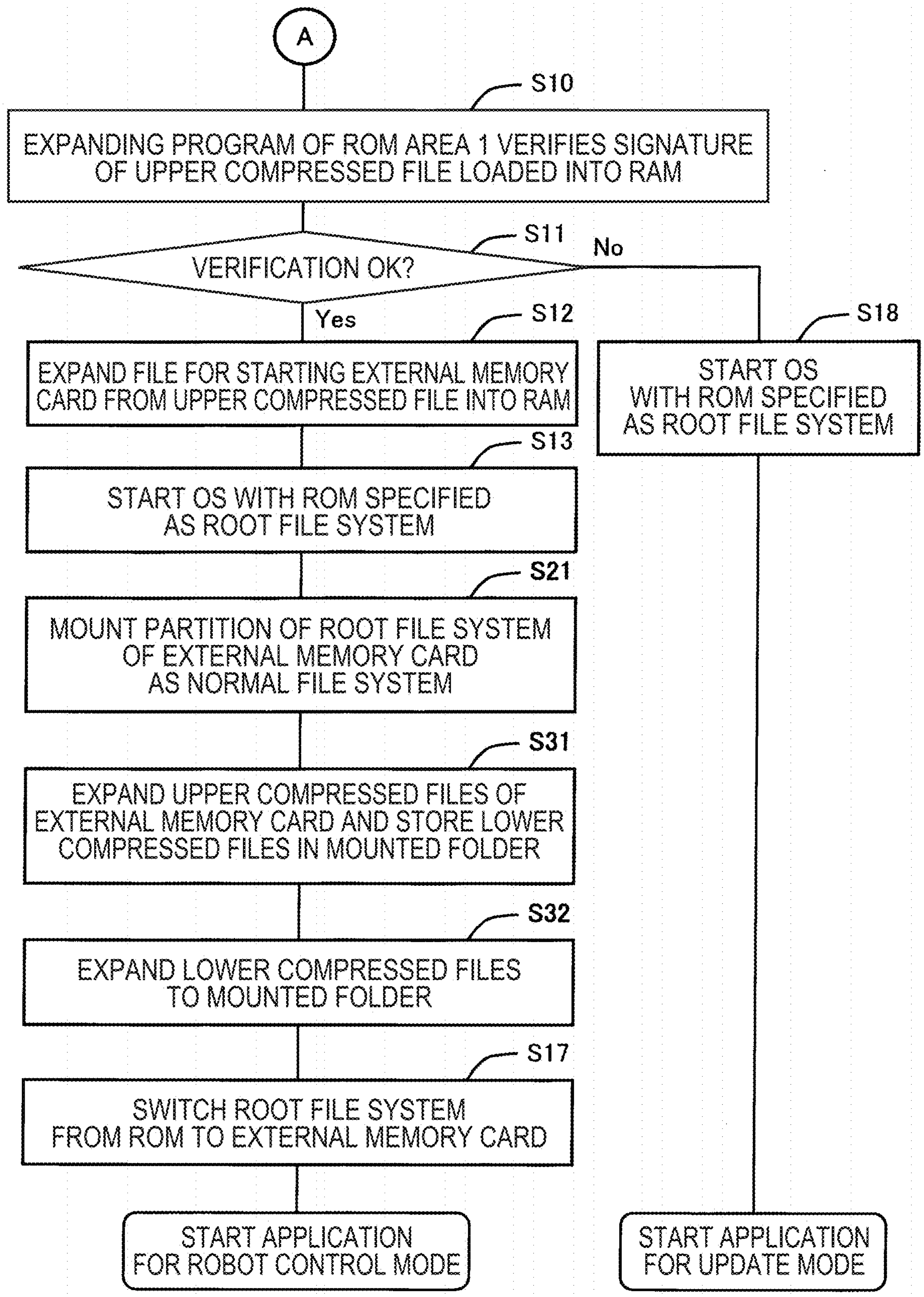
FIG. 8 is a flowchart showing a procedure of a startup process of the controller according to the third embodiment.

FIG. 7 is an explanatory diagram of the startup process of the controller 100 in the third embodiment, FIG. 8 is a flowchart showing a procedure of the startup process of the controller 100 in the third embodiment. FIG. 7 is a partial modification of FIG. 5 of the second embodiment, and FIG. 8 is a partial modification of FIG. 6 of the second embodiment. The processes in FIG. 3 are the same as those in the first and second embodiments, and a description thereof will be omitted.

The third embodiment is different from the second embodiment is only the following one point, except this is substantially the same as the second embodiment.

(1) Step S22 in FIG. 6 is replaced by steps S31 to S32 in FIG. 8.

In step S31 of FIG. 8, the OS kernel expands the upper compressed file CFa of the external memory card 140 and stores the lower compressed file CFb in the folder mounted in step S21. In this process, the lower compressed file CFb is written to the external memory card 140. In step S32, the OS kernel expands the lower compressed file CFb to the folder mounted in step S21. In step S32, the root directory in which the lower compressed file CFb is stored is moved using the pivot_root command, and a process of setting a new root directory for the root file system is executed. As a result, as shown in FIG. 7, the root file system is set in the external memory card 140. The description of other processes is omitted.

The third embodiment also has substantially the same effects as the first embodiment and the second embodiment. However, in the first embodiment and the second embodiment, since a process such as step S31 of writing the lower compressed file CFb in the external memory card 140 is not included, the number of times of writing in the external memory card 140 can be reduced. Therefore, there is an advantage that the life of the external memory card 140 is not shortened.

D. Fourth Embodiment

Figure 9:
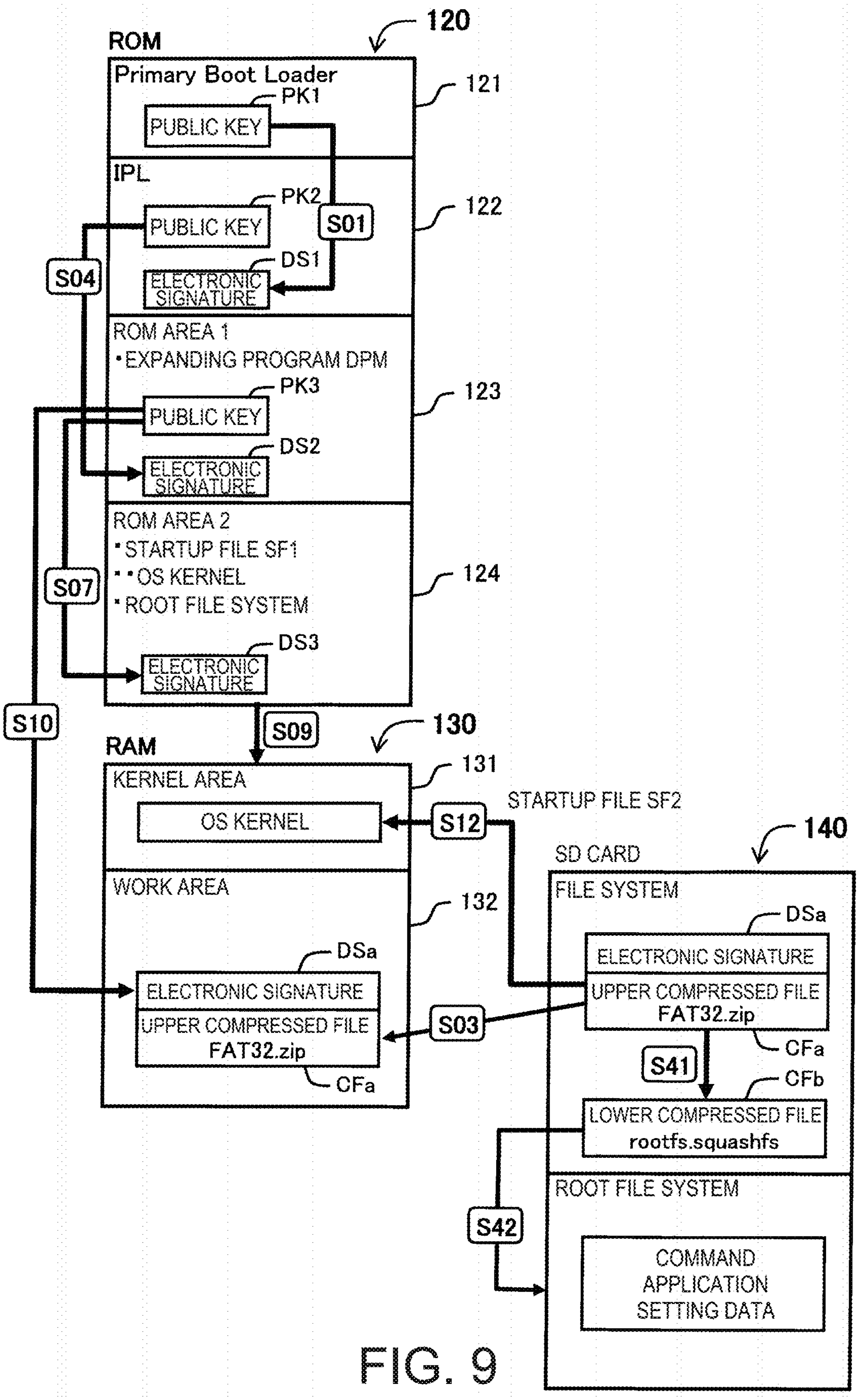
FIG. 9 is an explanatory diagram of a startup process of the controller according to the fourth embodiment.
Figure 10:
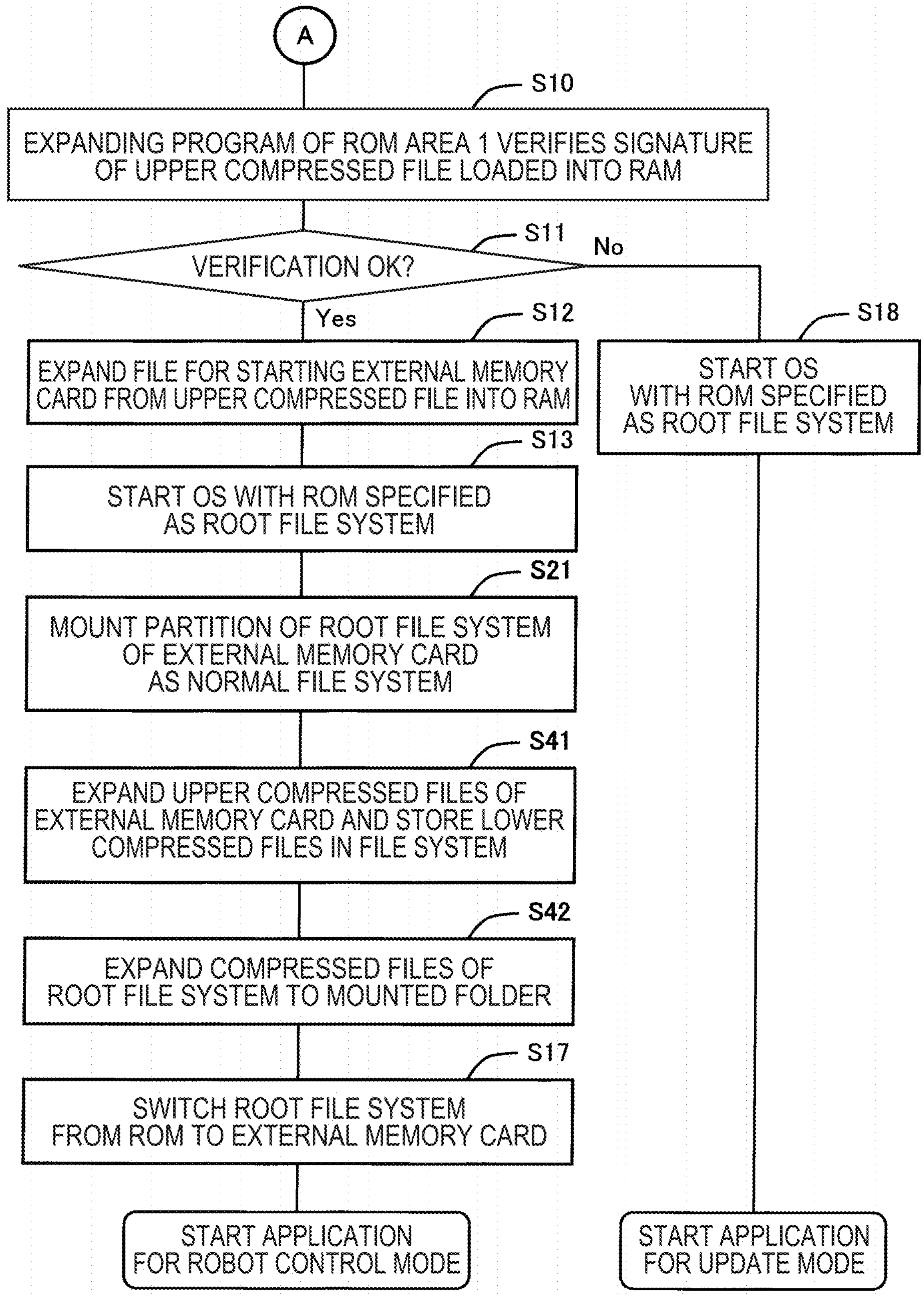
FIG. 10 is a flowchart showing a procedure of a startup process of the controller according to the fourth embodiment.

FIG. 9 is an explanatory diagram of a startup process of the controller 100 in the fourth embodiment, and FIG. 10 is a flowchart showing a procedure of the startup process. FIG. 9 is a partial modification of FIG. 5 of the second embodiment, and FIG. 8 is a partial modification of FIG. 6 of the second embodiment. The processes in FIG. 3 are the same as those in the first and second embodiments, and a description thereof will be omitted.

The fourth embodiment is different from the second embodiment in only the following one point and, except for this is, it substantially the same as the second embodiment.

(1) Step S22 in FIG. 6 is replaced by steps S41 to S42 in FIG. 10.

In step S41 of FIG. 10, the OS kernel expands the upper compressed file CFa of the external memory card 140 and stores the lower compressed file CFb in the file system of the external memory card 140. As a result, as shown in FIG. 9, the lower compressed file CFb is stored in the same file system as the upper compressed file CFa. In step S42, the OS kernel expands the lower compressed file CFb to the folder mounted in step S21. In step S42, the root directory in which the lower compressed file CFb is stored is moved using the pivot_root command, and a process of setting a new root directory for the root file system is executed. As a result, as shown in FIG. 9, the root file system is set in the external memory card 140. The description of other processes is omitted.

The fourth embodiment also has substantially the same effect as the third embodiment described above.

Other Forms

The present disclosure is not limited to the embodiments described above, but can be realized in various forms without departing from the scope of the present disclosure. For example, the present disclosure can also be realized by the following aspects. The technical features in the above embodiments that correspond to the technical features in each aspect described below can be replaced or combined as appropriate to solve some or all of the issues of this disclosure or to achieve some or all of the effects of this disclosure. If a technical feature is not described as an essential feature in the present specification, the technical feature can be deleted as appropriate.

(1) According to a first aspect of this disclosure, a setting method of a root file system of a computer includes (a) a step of reading a compressed file obtained by compressing the entire partition of the root file system and an electronic signature of the compressed file from an external storage device and loading the compressed file and the electronic signature into a work area of a RAM of the computer, (b) a step of executing verification of the electronic signature for the compressed file loaded in the work area, and (c) a step of, when the verification is successful, setting the root file system by expanding the compressed file in the external storage device. According to this method, the entire root file system can be subjected to signature verification to guarantee authenticity.

(2) The above method may further include (d) a step of setting a ROM of the computer as the root file system in the case where the verification is unsuccessful. According to this method, in the case where the verification of the compressed file fails, the authentic root file system stored in the ROM can be used.

(3) The above method may be such that step (a) includes a step of reading a first startup file containing an OS kernel from the ROM and expanding the first startup file in a kernel area of the RAM. According to this method, in the case where the verification of the compressed file fails, the OS kernel can be booted using the first startup file stored in the ROM.

(4) The above method may be such that the compressed file is compressed so as to include a second startup file containing the OS kernel and step (c) includes a step of reading out the compressed file from the external storage device, expanding the second startup file, and overwriting the first startup file in the kernel area. According to this method, in the case where the verification of the compressed file is successful, the OS kernel can be activated using the second startup file contained in the compressed file.

(5) According to a second aspect of this disclosure, a computer program for executing a process of setting up a root file system of a computer is provided. The computer program causes the computer to execute computer program is (a) a process of reading a compressed file obtained by compressing the entire partition of the root file system and an electronic signature of the compressed file from an external storage device and loading the compressed file and the electronic signature into a work area of a RAM of the computer, (b) a process of executing verification of the electronic signature for the compressed file loaded in the work area, and (c) a process of, when the verification is successful, setting the root file system by expanding the compressed file in the external storage device.

The present disclosure can be realized in various forms other than the above. For example, the disclosure can be realized in the form of a computer program for realizing the function of the controller, a non-transitory storage medium in which the computer program is recorded, or the like.

What is claimed is:

1. A setting method of a root file system of a computer, the setting method comprising:

(a) a step of reading a compressed file obtained by compressing the entire partition of the root file system and an electronic signature of the compressed file from an external storage device and loading the compressed file and the electronic signature into a work area of a RAM of the computer;

(b) a step of executing verification of the electronic signature for the compressed file loaded in the work area;

(c) a step of, when the verification is successful, setting the root file system by expanding the compressed file in the external storage device; and (d) a step of setting a ROM of the computer as the root file system in the case where the verification is unsuccessful, wherein the step (a) includes a step of reading a first startup file containing an OS kernel from the ROM and expanding the first startup file in a kernel area of the RAM, the compressed file is compressed so as to include a second startup file containing the OS kernel, and the step (c) includes a step of reading out the compressed file from the external storage device, expanding the second startup file, and overwriting the first startup file in the kernel area.

2. A non-transitory computer-readable storage medium storing a computer program for executing a process of setting up a root file system of a computer, the computer program causing the computer to execute:

(a) a process of reading a compressed file obtained by compressing the entire partition of the root file system and an electronic signature of the compressed file from an external storage device and loading the compressed file and the electronic signature into a work area of a RAM of the computer;

(b) a process of executing verification of the electronic signature for the compressed file loaded in the work area;

(c) a process of, when the verification is successful, setting the root file system by expanding the compressed file in the external storage device; and (d) a process of setting a ROM of the computer as the root file system in the case where the verification is unsuccessful, wherein the process (a) includes a process of reading a first startup file containing an OS kernel from the ROM and expanding the first startup file in a kernel area of the RAM, the compressed file is compressed so as to include a second startup file containing the OS kernel, and the process (c) includes a process of reading out the compressed file from the external storage device, expanding the second startup file, and overwriting the first startup file in the kernel area.

* * * * *